(No Model.) 2 Sheets—Sheet 1.
A. E. LYCAN.
SWINGING GATE.
No. 476,399. Patented June 7, 1892.
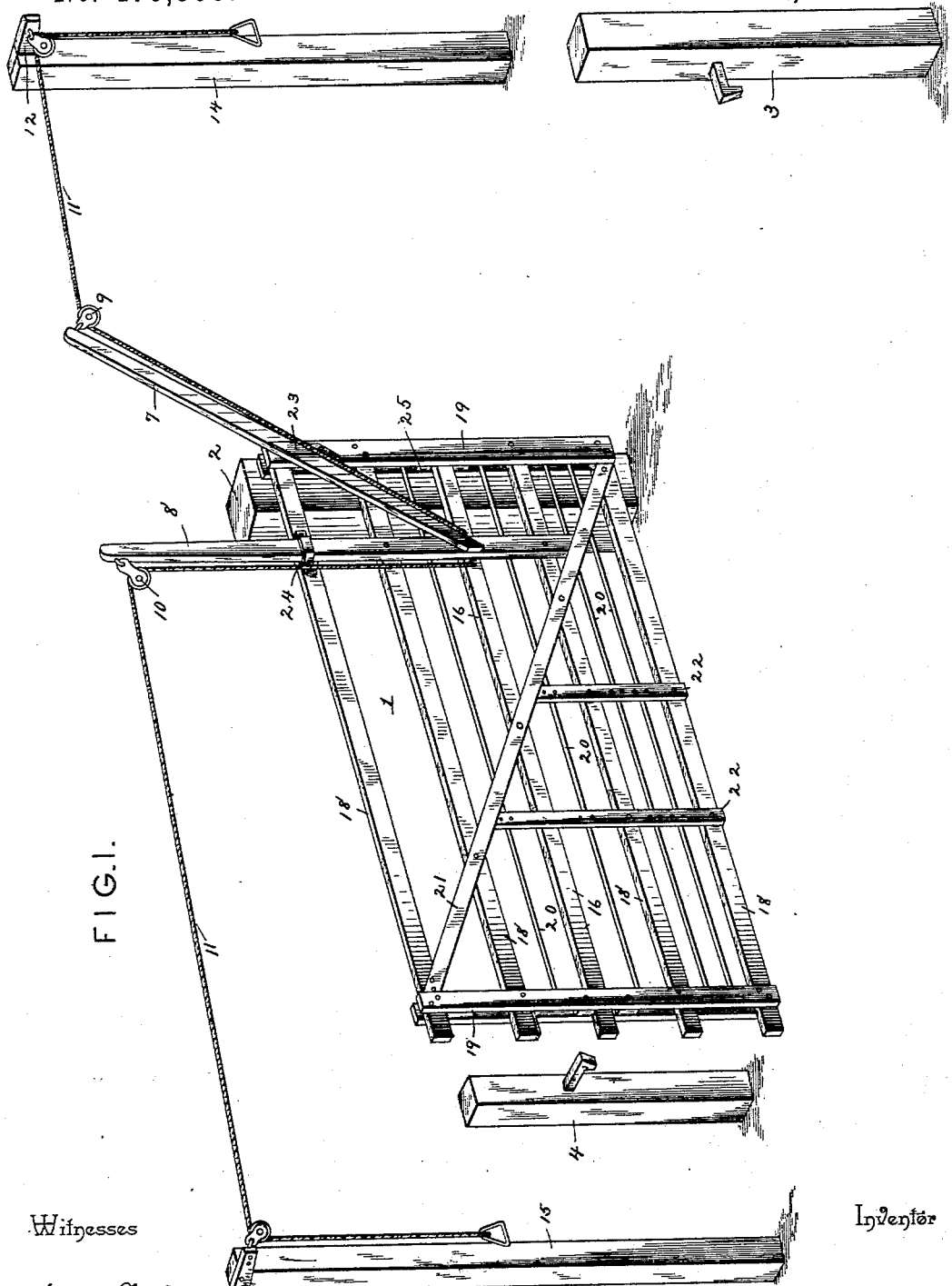
FIG. I.
Witnesses
Harry L. Ames
N. J. Riley
Inventor
A. E. Lycan.
By his Attorneys,
C. A. Snow & Co.

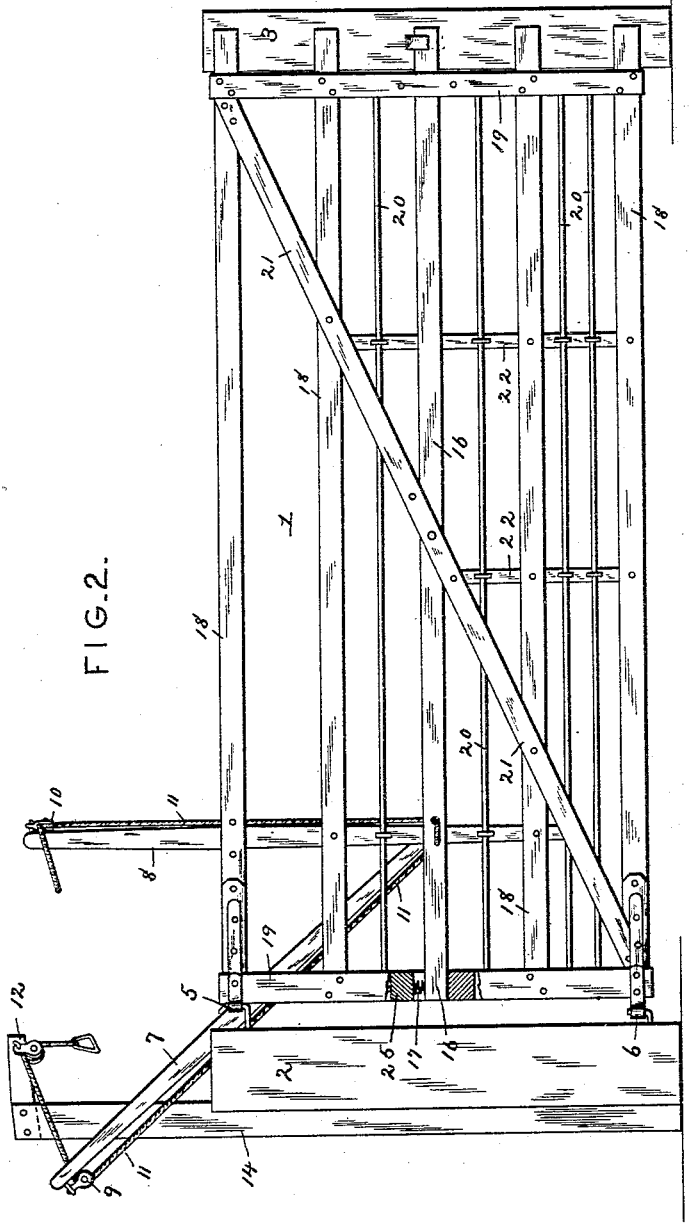

UNITED STATES PATENT OFFICE.

ALBERT E. LYCAN, OF PARIS, ILLINOIS.

SWINGING GATE.

SPECIFICATION forming part of Letters Patent No. 476,399, dated June 7, 1892.

Application filed March 14, 1892. Serial No. 424,889. (No model.)

*To all whom it may concern:*

Be it known that I, ALBERT E. LYCAN, a citizen of the United States, residing at Paris, in the county of Edgar and State of Illinois, have invented a new and useful Swinging Gate, of which the following is a specification.

The invention relates to improvements in gates.

The object of the present invention is to simplify and improve the construction of swinging gates and to enable the same to be operated with great ease.

The invention consists in the construction and novel combination and arrangement of parts hereinafter fully described, illustrated in the accompanying drawings, and pointed out in the claims hereto appended.

In the drawings, Figure 1 is a perspective view illustrating a gate constructed in accordance with this invention and showing the same partly open. Fig. 2 is a side elevation, partly in section, the gate being closed.

Like numerals of reference indicate corresponding parts in all the figures of the drawings.

1 designates a swinging gate, which is hinged to a post 2 and which closes against a latch-post 3 and is secured when open to a supplemental latch-post 4. The upper hinge 5 has its pintle arranged adjacent to the gate, and the lower hinge 6 has its pintle arranged close to the hinge-post, so that when the gate is open its free outer end will be raised, whereby by merely releasing the gate from the supplemental latch-post the gate will be closed automatically by gravity.

At the inner end of the gate and projecting rearward therefrom is an inclined bar 7, and near the inner end of the gate is a vertical bar 8. The bars 7 and 8 project above the gate and are provided at their upper ends with pulleys 9 and 10, over which passes an operating-rope 11. The operating-rope has its ends provided with handles and suspended from horizontal arms 12 and 13 of uprights 14 and 15, and it is connected between its ends to the inner portion of a horizontally-disposed latch-bar 16, which is pivotally mounted on the gate and has its outer end thrown upward by a spring 17, engaging the upper edge of its inner end. The operating-rope extends upward from the latch-bar along the vertical bar 8 and the inclined bar 7, and the upper ends of these bars are a sufficient distance on either side of the hinges of the gate to provide sufficient leverage to enable the gate to be easily opened by a slight pull on the operating-rope. As soon as there is a pull on the operating-rope, the latch-bar is disengaged from the latches of the posts 3 and 4, and if the gate is being opened a further draft will open it, and if it is desired to close the gate it will close automatically without the use of the operating-rope.

The gate consists of horizontal rails 18, the middle one being formed by the latch-bar, vertical end bars 19, arranged on opposite sides of the rails 18, horizontal wires 20, inclined braces 21, and vertical braces 22, which support one of the inclined braces and also serve as means for supporting the wires at intermediate points. The wires are stapled to the vertical braces 22 and have their ends bent at an angle and secured by staples to the inner faces of the end bars. The bars 7 and 8 are secured at the top of the gate by metal pieces 23 and 24. The ends of the latch-bar are arranged between blocks 25, and the spring 17 is interposed between the upper block at the inner end of the gate and the inner end of the latch-bar. The upright 15, which is arranged near the supplemental latch-post 4, is substantially in a line with the same and the hinge-post, and the other upright 14 is arranged a little to the rear of this position. The outer ends of the horizontal arms of the uprights are provided with pulleys, over which passes the operating-rope.

What I claim is—

1. The combination of a swinging gravity-closing gate, a vertical bar arranged near the inner end of the gate and projecting from the top thereof, an inclined bar arranged at the top of the gate and projecting upward and rearward therefrom, and an operating-rope connected with the tops of the bars, substantially as described.

2. The combination of a swinging gravity-closing gate provided with a horizontal latch-bar pivotally mounted on it, a vertical bar arranged near the inner end of the gate and projecting from the top thereof and provided with a pulley, an inclined bar arranged at the inner end of the gate and projecting upward and rearward therefrom and provided with a pulley, and an operating-rope connected to the latch-bar and extending therefrom along the vertical and inclined bars and over the pulleys thereof, substantially as described.

In testimony that I claim the foregoing as my own I have hereto affixed my signature in the presence of two witnesses.

ALBERT E. LYCAN.

Witnesses:
A. H. HODGE,
J. G. LYCAN.